US009012340B2

United States Patent
Fujiyama et al.

(10) Patent No.: US 9,012,340 B2
(45) Date of Patent: Apr. 21, 2015

(54) WOVEN FABRIC FOR AIR BAGS, AIR BAGS AND PROCESS FOR PRODUCTION OF THE WOVEN FABRIC

(75) Inventors: Tomomichi Fujiyama, Osaka (JP); Daisuke Yahata, Otsu (JP); Daisuke Yokoi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 1429 days.

(21) Appl. No.: 12/308,717

(22) PCT Filed: Jun. 22, 2007

(86) PCT No.: PCT/JP2007/062613
§ 371 (c)(1),
(2), (4) Date: Oct. 30, 2009

(87) PCT Pub. No.: WO2007/148791
PCT Pub. Date: Dec. 27, 2007

(65) Prior Publication Data
US 2010/0048079 A1 Feb. 25, 2010

(30) Foreign Application Priority Data
Jun. 23, 2006 (JP) .................................. 2006-173538

(51) Int. Cl.
*D03D 15/00* (2006.01)
*B60R 21/16* (2006.01)
*D03D 1/02* (2006.01)
*B60R 21/235* (2006.01)
*D03D 13/00* (2006.01)

(52) U.S. Cl.
CPC ..... *B60R 21/235* (2013.01); *B60R 2021/23509* (2013.01); *D03D 1/02* (2013.01); *D03D 13/008* (2013.01); *D03D 15/00* (2013.01); *D03D 15/0088* (2013.01); *D10B 2201/24* (2013.01); *D10B 2321/021* (2013.01); *D10B 2331/02* (2013.01); *D10B 2331/021* (2013.01); *D10B 2331/04* (2013.01); *D10B 2505/124* (2013.01)

(58) Field of Classification Search
CPC ................... B60R 2021/23509; B60R 21/235; D03D 13/008; D03D 15/00; D03D 15/0088; D03D 1/02; D10B 2201/24; D10B 2321/021; D10B 2331/02; D10B 2331/021; D10B 2331/04; D10B 2505/124
USPC ........................................ 280/728.1; 442/182
See application file for complete search history.

(56) References Cited

U.S. PATENT DOCUMENTS

| 4,337,801 A | * | 7/1982 | Suzuki et al. .................. 139/57 |
| 5,421,378 A | * | 6/1995 | Bowers et al. ............. 139/435.1 |

FOREIGN PATENT DOCUMENTS

| JP | 61-41343 A | 2/1986 |
| JP | 03-176250 A | 7/1991 |
| JP | 06-234346 A | 8/1994 |
| JP | 2000-303303 A | 10/2000 |
| JP | 2000303303 A | * 10/2000 |
| JP | 2002-138339 A | 5/2002 |
| JP | 2005-281933 A | 10/2005 |
| JP | 2006-016707 A | 1/2006 |

OTHER PUBLICATIONS

Chinese Office Action dated May 17, 2010, issued in Chinese Patent Application No. 200780023688.3.
Supplementary European Search Report mailed on Feb. 18, 2011, in European Appln. No. 07767422.4-2314/2042628.

* cited by examiner

*Primary Examiner* — Peter Y Choi
*Assistant Examiner* — Vincent A Tatesure
(74) *Attorney, Agent, or Firm* — Kubovcik & Kubovcik

(57) ABSTRACT

An airbag fabric, airbag and method for making the airbag fabric, the fabric consisting of warp and weft yarns of synthetic fiber yarn, characterized by satisfying the following requirements:
(1) the total fineness of the synthetic fiber yarn is 100 to 700 dtex;
(2) $Nf/Nw \geq 1.10$
wherein,
Nw represents the weaving density of warp yarns (yarns/2.54 cm) and
Nf represents the weaving density of weft yarns (yarns/2.54 cm);
(3) $EC1 \geq 400N$ and $EC2 \geq 400N$
wherein,
EC1 represents the edgecomb resistance (N) in the machine direction, as determined according to ASTM D6479-02, and
EC2 represents the edgecomb resistance (N) in the crosswise direction as determined according to ASTM D6479-02;
(4) $0.85 \leq EC2/EC1 \leq 1.15$; and
(5) the air permeability, as determined according to the Frajour type method specified in JIS L1096 at a test pressure difference of 19.6 kPa, is 1.0 L/cm²·min or less.

13 Claims, No Drawings

WOVEN FABRIC FOR AIR BAGS, AIR BAGS AND PROCESS FOR PRODUCTION OF THE WOVEN FABRIC This application is a 371 of international application PCT/JP2007/062613, filed Jun. 22, 2007, which claims priority based on Japanese patent application No. 2006-173538 filed Jun. 23, 2006, which is incorporated herein by reference.

TECHNICAL FIELD

The present invention relates to woven fabric for airbags.

BACKGROUND ART

Recently along with increasing concern about traffic safety, various airbags have been developed for assured safety of passengers on car accident and commercialized rapidly because of recognition of the effectiveness thereof.

An airbag protects a driver or a passenger by expanding itself in a quite short period of time after vehicle collision and thus, capturing the passenger thrown away in reaction of the collision and absorbing the impact then. For that purpose, the fabric for the bag desirably has low air permeability. The fabric should also have a strength higher than a particular value for endurance to the impact during inflation of the airbag. It is further needed to reduce the yarn displacement, i.e., to improve yarn displacement resistance, in the sewn region as much as possible, to keep the internal pressure in the bag at a particular value or higher for inflation of the airbag and protection of passengers. In addition, compactness in packing is desirable from the points of appearance in the car and relationship with other parts, and there is increasing demand for cost reduction.

Coated fabrics, i.e., airbag fabrics coated with a resin or bonded to a film, have been proposed as means for reducing the air permeability of fabric.

However, resin coating or film bonding is unfavorable for airbag fabrics, because it leads to increase in fabric thickness and decrease in compactness in packing. In addition, addition of such a resin coating step or a film-bonding step also causes a problem of increase in production cost.

To solve the problems above, recently proposed were uncoated fabrics having low air permeability that were prepared by weaving synthetic filament yarns such as of polyamide or polyester fiber at high density without resin processing. For example, disclosed as a means for improving air permeability is a method of using a fabric in a symmetrical fabric structure that was prepared by using a synthetic filament yarns having a yarn fineness of 300 to 400 dtex (see, for example, Patent Document 1). If prepared by the method, a fabric consisting of warp and weft yarns of synthetic fiber yarn having a fiber fineness of 300 to 400 dtex at a yarn counts of 23 to 28 yarns/cm in a symmetric fabric structure, wherein the warp yarns and the weft yarns are woven substantially symmetrically in yarn density, has an air permeability of 10 L/dm²·min or less at a test pressure difference ΔP of 500 Pa and shows mechanical properties isotropic in the warp and weft yarn directions.

However, the method demands production of a fabric containing the warp and weft yarns respectively at a density of 23 to 28 yarns/cm, for obtaining favorable air permeability and particular mechanical performances. For that reason, if the edgecomb resistance, an indicator of the degree of airbag yarn displacement in the sewn region by inflation of the airbag for passenger protection, is examined, there is a problem of ill-balance thereof in the fabric warp and weft directions.

On the other hand, known for improvement in productivity while making the base cloth isotropic in strength and flexibility, is a method of specifying the so-called density coefficient rate defined by Formula: {weft yarn density (yarns/cm)×(weft yarn fiber fineness (denier))$^{1/2}$}÷{warp yarn density (yarns/cm)×(warp yarn fiber fineness (denier))$^{1/2}$}, (see, for example, Patent Document 2).

The method allows reduction the difference in bending resistance between in the fabric warp and weft directions if the density coefficient rate is adjusted to 0.92 or less, and thus, allows improvement in airbag compactness in packing.

However, the document only focuses on isotropy in bending resistance. Reduction of air permeability, the most important property for airbag, was not even mentioned there. In addition, when the edgecomb resistance is examined, the fabric edgecomb resistance in the weft direction is extremely low, compared to that in the warp direction, causing a problem of extremely ill-balance between the edgecomb resistances in the warp and weft directions.

In addition, disclosed is an airbag fabric wherein the weaving density of warp yarns and the weaving density of weft yarns are made different from each other for improvement in productivity while keeping the airbag isotropic during inflation (see, for example, Patent Document 3).

However, the document discloses fabrics wherein the weaving density of warp yarns is higher than the weaving density of weft yarns. In the fabrics prepared by the method, the fabric edgecomb resistance in the weft direction is extremely lower than that in warp direction, causing a problem that the balance in the edgecomb resistances in the warp and weft directions is very low.

Alternatively, an airbag base cloth woven at ultrahigh weaving density was disclosed as a base cloth superior in the yarn displacement resistance in the sewn region (see, for example, Patent Document 4).

However, the invention described in the document uses a fabric having high weaving density as the means of raising the edgecomb resistance. Thus, the fabric is inferior in the compactness in packing needed for airbag, and thus, is not a base cloth superior both in edgecomb resistance and compactness in packing.

As described above, there is no airbag fabric produced by conventional technology that is superior all in low air permeability, high strength and compactness in packing that are needed for airbag fabrics and smaller in yarn displacement in the airbag sewn region when the airbag is inflated for protection of passenger.

Patent Document 1: Japanese Unexamined Patent Publication No. 3-137245 (Claim 1)
Patent Document 2: Japanese Unexamined Patent Publication No. 2001-200447 (Claim 1, Paragraph 0013)
Patent Document 3: Japanese Unexamined Patent Publication No. 2000-303303 (Claims 3 and 7, Paragraph 0038)
Patent Document 4: Japanese Unexamined Patent Publication No. 2006-16707 (Claim 1)

SUMMARY OF THE INVENTION

Problems to be Solved by the Invention

An object of the present invention is to provide an airbag fabric and an airbag that eliminates the problems associated with the conventional technology and is favorable in low air permeability and compactness in packing that are needed for airbag fabric and resistance to the yarn displacement in the airbag sewn region when the airbag is inflated for protection of passenger.

Means to Solve the Problems

Accordingly, the present invention relates to an airbag fabric consisting of warp and weft yarns of the synthetic fiber yarn, characterized by satisfying the following requirements:

(1) the total fineness of the synthetic fiber yarn is 100 to 700 dtex;

(2) CF2/CF1≥1.10 wherein,

CF1 represents the cover factor of the warp yarns:
CF1=(Dw×0.9)$^{1/2}$×Nw,
CF2 represents the cover factor of the weft yarns:
CF2=(Df×0.9)$^{1/2}$×Nf,
Dw represents the total fineness of the warp yarn (dtex),
Df represents the total fineness of the weft yarn (dtex),
Nw represents the weaving density of warp yarns (yarns/2.54 cm), and
Nf: the weaving density of weft yarns (yarns/2.54 cm);

(3) EC1≥400N and EC2≥400N, wherein,

EC1 represents the edgecomb resistance (N) in the warp direction, as determined according to ASTM D6479-02, and EC2 represents the edgecomb resistance (N) in the weft direction, as determined according to ASTM D6479-02;

(4) 0.85≤EC2/EC1≤1.15; and (5) the air permeability. as determined according to the Frajour type method specified in JIS L1096 at a test pressure difference of 19.6 kPa, is 1.0 L/cm$^2$·min or less.

The present invention also relates to an airbag characterized by being produced from the airbag fabric by sewing.

The present invention also relates to a method of producing the airbag fabric, characterized in that the fabric is woven while the warp yarn tension is adjusted to 75 to 230 cN/yarn.

The present invention also relates to the method of producing the airbag fabric according to the present invention, characterized by weaving the fabric while making a difference of 10 to 90% between the tensions of the top and bottom yarns applied during warp yarn shedding.

Advantageous Effects of the Invention

The present invention provides a fabric superior in low air permeability and packability and also in yarn displacement resistance in the airbag sewn region.

DESCRIPTION OF THE PREFERRED EMBODIMENTS

The airbag fabric according to the present invention has warp and weft yarns of the synthetic fiber filament satisfying the following requirements:

[Synthetic Fiber Yarn]

Examples of the synthetic fibers for use in the airbag fabric according to the present invention include various synthetic fibers such as polyamide-based fibers, polyester-based fibers, aramide-based fibers, rayon-based fibers, polysulfone-based fibers, and ultrahigh-molecular weight polyethylene-based fibers Among them, polyamide and polyester-based fibers, which are produced in great amount and thus cost-effective, are preferable.

Examples of the polyamide-based fibers include fibers of nylon 6, nylon 66, nylon 12, nylon 46, copolymerized polyamide of nylon 6 and nylon 66, copolyamides of nylon 6 with a polyalkylene glycol, a dicarboxylic acid, an amine or the like, and the like. Nylon 6 and nylon 66 fibers are particularly superior in impact resistance and thus preferable.

Examples of the polyester-based fibers include homopolyester such as polyethylene terephthalate or polybutylene terephthalate, or any copolymer thereof additionally containing units derived from another acid component of a polyester, such as an aliphatic dicarboxylic acid, for example, isophthalic acid, 5-sodiumsulfoisophthalic acid or adipic acid.

These synthetic fibers may contain additives such as heat stabilizer, antioxidant, photostabilizer, lubricant, antistatic agent, plasticizer, thickener, pigment, and flame retardant, for improvement in productivity in spinning-drawing and processing steps and in the properties of the fiber.

The cross-sectional shape of the synthetic fiber monofilament for use is preferably circular. The fiber may have a flat cross-sectional shape instead of the circular cross-sectional shape. Use of a flat cross-sectioned fiber leads to increase in packing efficiency of the yarn when woven into fabric and reduction in volume of the voids among the fabric monofilaments, and thus, gives a fabric smaller in air permeability, compared to the fabric made with a circular cross-sectioned fiber having the same fiber fineness in the same fabric structure. As for the flat cross-sectional shape, when the monofilament cross-sectional shape is approximated to ellipse, a flatness ratio, which is defined as the ratio of the major diameter (D1) to minor diameter (D2), (D1/D2), is preferably 1.5 to 4, more preferably 2.0 to 3.5. The flat cross-sectional shape may be truly geometrically elliptical or, for example, rectangular, rhomboid or cocoon-shaped, and it may also be bilaterally symmetrical or bilaterally unsymmetrical. Alternatively, the shape may be in combination of these shapes. Yet alternatively, it may be a shape based on that above, with some irregularity thereon or voids inside.

In the airbag fabric according to the present invention, yarns of the same synthetic fibers among the synthetic fibers described above are preferably used as the warp and weft yarns. The warp and weft yarns of the same synthetic fiber yarn mean that the warp yarns and the weft yarns are made of a polymer of the same kind, the warp and weft yarns have the same monofilament fineness, and the warp yarn and weft yarns have the same total fineness.

The same kind of polymers means, for example, polymers having a common main recurring unit of polymer such as combination of nylon 66 resins or polyethylene terephthalate resins. For example, a combination of a homopolymer and its copolymer is also included in the same kind of polymers according to the present invention. Further, a combination of copolymers identical in presence or absence, kind and amount of the copolymerization components is preferably for production control, because there is no need for differentiation of the warp and weft yarns.

The phrase "same monofilament fineness or total fineness" means that the variance in the monofilament fineness or total fineness is not larger than 5% of the lowest fiber fineness of the warp and weft yarns.

The synthetic fiber yarn for use in the present invention preferably consists of relatively low-monofilament-fineness synthetic fiber filaments having a monofilament fineness of 1 to 7 dtex. When the monofilament fineness is 1 dtex or more, it is possible to produce the synthetic fiber filament without any additional device. On the other hand, it is possible to improve the flexibility of the synthetic fiber filament, by making the monofilament fineness 7 dtex or less. The monofilament fineness is more preferably 1.5 to 4.0 dtex, more preferably 2.0 to 3.0 dtex. When the monofilament fineness is in the range specified above, the volume of the voids among the fabric monofilaments becomes smaller, leading to further increase in packing efficiency of the fiber. It may be reduce the rigidity of the synthetic filament and thus improve the packability of the airbag by adjusting the monofilament fineness into the low range above. It is also possible to reduce air permeability. As will be described below, it is also possible to improve the stability of the fabric structure made with the warp and weft yarns drastically and to improve yarn displacement resistance significantly, by producing the fabric under a certain weaving condition, for example in the state where the warp yarn tension is raised.

The tenacity of the synthetic fiber yarn constituting the airbag fabric according to the present invention is preferably 8.0 to 9.0 cN/dtex, more preferably 8.3 to 8.7 cN/dtex both for warp and weft yarns, for satisfying the mechanical properties required for airbag fabric and from the point of spinning operation.

The airbag fabric according to the present invention satisfies the following requirements (1) to (5).

(1) Total Fineness of Synthetic Fiber Yarn

The total fineness of the synthetic fiber yarn should be 100 to 700 dtex. A total fineness of 100 dtex or more allows preservation of favorable fabric strength. When the total fineness is less than 100 dtex, the weft yarn may be bent because of its low rigidity during formation of the bent warp-yarn structure described below. As a result, the warp yarn does not have a significant bent structure, leading to insufficient increase in the contact length between the warp and weft yarns. In other words, the edgecomb resistance is not increased in the warp direction. In addition, low air permeability is not obtained. Alternatively when the total fineness is 700 dtex or less, it may assure the compact packability and low air permeability. The total fineness is more preferably 200 to 500 dtex, still more preferably 300 to 400 dtex. It is possible, by controlling the total fineness in the range above, to improve the strength, edgecomb resistance, low-air permeability, flexibility, compact packability of the fabric balancedly.

(2) Relationship Between the Warp Yarn Cover Factor (CF1) and the Weft Yarn Cover Factor (CF2) of Fabric In the airbag fabric according to the present invention, it is important for the warp yarn cover factor (CF1) and the weft yarn cover factor (CF2) to satisfy the relationship of:

$$CF2/CF1 \geq 1.10,$$

preferably the relationship of:

$$CF2/CF1 \geq 1.12.$$

The warp yarn cover factor (CF1) or the weft yarn cover factor (CF2) of fiber is a value calculated from the total fineness and the weaving density of the warp or weft yarn. When the total fineness of warp yarn is designated as Dw (dtex), the total fineness of weft yarn as Df (dtex), the weaving density of warp yarns as Nw (yarns/2.54 cm), and the weaving density of weft yarns as Nf (yarns/2.54 cm), they are represented by the following Formulae:

$$CF1 = (Dw \times 0.9)^{1/2} \times Nw$$

$$CF2 = (Df \times 0.9)^{1/2} \times Nf$$

It is essential to make the weaving density of warp yarns not identical with the weaving density of weft yarns and adjust the ratio of CF2/CF1 to 1.10 or more, for improvement in edgecomb resistance of the fabric balancedly both in the warp and weft directions.

In addition, the airbag fabric according to the present invention preferably has the warp and weft yarns of the same synthetic fiber filaments and also a weaving density of warp yarns Nw and a weaving density of weft yarns Nf that satisfy the relationship of Nf/Nw≥1.10. The weaving density of weft yarns is the number of multifilament yarns woven per 1 inch (2.54 cm) of the fabric in the warp direction, as defined in JIS L1096 8.6.1. Alternatively, the weaving density of warp yarns is the number of multifilament yarns woven per 1 inch (2.54 cm) of the fabric in the weft direction. A Nf/Nw ratio of 1.10 or more is preferable, for balanced improvement in edgecomb resistance both in the warp and weft directions. Preferably, Nf/Nw≥1.12.

(3) Edgecomb Resistance in the Warp and Weft Directions

For improvement in balance of the edgecomb resistance in the warp and weft directions, the inventors had studies intensively on the relationship of the cover factor or the weaving density of warp yarns and the cover factor or the weaving density of weft yarns with the edgecomb resistance in both directions. The edgecomb resistance was determined, as the cover factor or the weaving density of warp yarns was kept constant and the cover factor or the weaving density of weft yarns was altered. Results are summarized in Table 1. Table 1 is a table showing the results obtained by measuring the change in the cover factors of warp and weft yarns (CF1 and CF2), the change in the ratio CF2/CF1, the change in the edgecomb resistances in the warp and weft directions (EC1 and EC2) and change in the ratio EC2/EC1, while the weaving density of warp yarns was kept constant at 56 (yarns/2.54 cm) and the weaving density of weft yarns was changed to 52, 56, 62, or 64 (yarns/2.54 cm), each at level 1, 2, 3 or 4.

TABLE 1

|  | Unit | Level 1 | Level 2 | Level 3 | Level 4 |
| --- | --- | --- | --- | --- | --- |
| Total fineness of warp yarn | dtex | 350 | 350 | 350 | 350 |
| Monofilament fineness of warp yarn | dtex | 2.6 | 2.6 | 2.6 | 2.6 |
| Total fineness of weft yarn | dtex | 350 | 350 | 350 | 350 |
| Monofilament fineness of weft yarn | dtex | 2.6 | 2.6 | 2.6 | 2.6 |
| Weaving density of warp yarns (Nw) | yarns/2.54 cm | 56 | 56 | 56 | 56 |
| Weaving density of weft yarns (Nf) | yarns/2.54 cm | 52 | 56 | 62 | 64 |
| Cover factor of warp yarns (CF1) |  | 994 | 994 | 994 | 994 |
| Cover factor of weft yarns (CF2) |  | 923 | 994 | 1100 | 1136 |
| CF2/CF1 |  | 0.93 | 1.00 | 1.11 | 1.14 |
| Edgecomb resistance in machine direction (EC1) | N | 340 | 435 | 510 | 570 |
| Edgecomb resistance in crosswise direction (EC2) | N | 165 | 295 | 501 | 604 |
| EC2/EC1 |  | 0.49 | 0.68 | 0.98 | 1.06 |

As shown in Table 1, increase in the cover factor or the weaving density of weft yarns relative to the cover factor or the weaving density of warp yarns leads to improvement in the edgecomb resistance of fabric in the weft direction. In addition, the edgecomb resistance in the warp direction is also found to be improved, and thus, the edgecomb resistances are improved both in the warp and weft directions balancedly. The edgecomb resistance is a value, as determined according to ASTM D6479-02; and specifically, the edgecomb resistance in the machine direction is the maximum load applied to the fabric that is measured when a pin is inserted along a weft yarn and the weft yarn is pulled in the direction of warp yarn with the pin, while the edgecomb resistance in the weft direction is the maximum load applied to the fabric that is measured when a pin is inserted along a warp yarn and the warp yarn is pulled in the direction of weft yarn with the pin.

The mechanism for the improvement in the edgecomb resistances in the warp and weft directions of a fabric having a cover factor or a weaving density of weft yarns relatively higher than the cover factor or the weaving density of warp yarns (hereinafter, referred to as "weft-rich fabric") over the edgecomb resistance of a fabric having warp yarns and weft yarns having the same cover factor or weaving density (hereinafter, referred to as, "symmetrical fabric") seems to be as follows:

During weaving in a loom, the weft yarn is inserted between the threads of warp yarns moving upward and downward by shedding movement at a tension greater than that of the warp yarns, and thus, the resulting fabric has a structure in which the weft yarns are strained relatively in the fabric, and in which the warp yarns relatively bent as shuttle in the inside and outside of the fabric.

In the structure of the weft yarn strained and the warp yarns bent, the resistance of the weft yarn to movement in the warp direction is considered to be mainly governed by the contact length with the bent warp yarns, while the resistance of the warp yarn to movement in the weft direction is considered to be mainly governed by the number of contact points.

Specifically, because a weft-rich fabric can have structure in which the warp yarns are bent more significantly than that of the symmetrical fabric and thus the contact length between the warp and weft yarns is more, the resistance to the movement of the weft yarns by the pin, i.e., the edgecomb resistance thereof in the warp direction, seems to be increased. In addition, the edgecomb resistance of warp yarn to movement by a pin and thus, the edgecomb resistance in the weft direction are greater, probably because the number of the contact points between the warp and weft yarns is greater in weft-rich fabric than in symmetrical fabric.

On the other hand, the fabric having a cover factor or a weaving density of warp yarns relatively higher than the cover factor or the weaving density of weft yarns (hereinafter referred to as, "warp rich fabric") has a smaller number of weft yarns inserted between the treads of warp yarns, and thus, has a warp yarn-bent structure smaller than that of the symmetrical fabric and a smaller contact length between the warp and weft yarns, and consequently, the resistance of the weft yarn to movement by a pin and the edgecomb resistance in the warp direction are smaller. The warp rich fabric has a smaller number of contact points between the warp and weft yarns than symmetrical fabric, and thus, the resistance of the warp yarn to movement in the weft direction by a pin is smaller and thus, the edgecomb resistance thereof in the weft direction is also smaller.

The warp yarn cover factor (CF1) and the weft yarn cover factor (CF2) of fabric are both, preferably 950 to 1250. Control of the cover factor in the range above leads to desirable balanced improvement in compact packability, low-air permeability and edgecomb resistance of the fabric. A cover factor of 950 or more in each case is effective in reducing the air permeability and increasing the edgecomb resistance. A cover factor of 1250 or less in each case is effective in improving the compact packability.

The sum of CF1 and CF2 is preferably 2000 or more and less than 2300 for balanced improvement all in compact packability, low-air permeability and edgecomb resistance. A sum of CF1 and CF2 at 2000 or more is effective in producing a fabric having low-air permeability and improved edgecomb resistance. Alternatively, the compact packability remains unimpaired when the sum of CF1 and CF2 is less than 2300.

The airbag fabric according to the present invention desirably has an edgecomb resistance in the warp direction and an edgecomb resistance in the weft direction respectively of 400N or more, preferably of 450N or more and more preferably of 500N or more. When the edgecomb resistances in both directions are 400N or more, it is possible to prevent yarn displacement in the sewn region as much as possible and retain the internal pressure in the airbag when the airbag is inflated for passenger protection.

(4) Relationship Between the Edgecomb Resistances in the Warp and Weft Directions It is particularly important that the airbag fabric according to the present invention preferably has a ratio of the edgecomb resistance in the warp direction (EC1) to the edgecomb resistance in the weft direction (EC2) satisfying the following Formula:

$$0.85 \leq EC2/EC1 \leq 1.15$$

preferably, $$0.90 \leq EC2/EC1 \leq 1.10.$$

When the ratio of the edgecomb resistance in the warp direction (EC1) to that in the weft direction (EC2) is in the relationship above, it may prevent yarn displacement in the sewn region when the airbag is inflated for passenger protection as much as possible and retain the internal pressure of the airbag. Generally, airbags are inflated isotropically in all directions, and, if EC1 and EC2 do not satisfy the relationship above, there is the yarn displacement in sewn region generated in the direction toward the region lower in edgecomb resistance, prohibiting preservation of the airbag internal pressure.

(5) Air Permeability

The airbag fabric according to the present invention should have an air permeability, as determined by the Frajour-type method specified in JIS L1096 at a test pressure difference of 19.6 kPa, of 1.0 L/cm$^2$·min or less, preferably 0.7 L/cm$^2$·min or less. When the air permeability is adjusted in the range above, it may use the expansion gas supplied from inflator on collision efficiently for reliable protection of passenger. An air permeability of more than 1.0 L/cm$^2$·min is undesirable, because it prohibits preservation of the airbag expanded state after collision and thus leads to reduced passenger protection.

(Miscellaneous)

The airbag fabric according to the present invention preferably has a tensile strength, as determined by the strip method specified in JIS K6404-3, of 400N/cm or more, more preferably 500N/cm or more, and still more preferably 550N/cm or more. A tensile strength of 400N/cm or more prevents breakage of the fabric and thus of airbag when the airbag is inflated for passenger protection.

[Production Method]

Hereinafter, the method of producing the airbag fabric according to the present invention will be described.

The airbag fabric according to the present invention is produced by weaving it with warp and weft yarns of the same synthetic fiber yarn, while the fabric weft-yarn weaving density is adjusted to be larger than the fabric warp-yarn weaving density.

First, warp yarns of the material and the fineness described above are placed in a loom, and also a weft yarn is inserted therein. Examples of the weaving machines for use include water jet loom, air jet loom, repier loom, and the like. Among them, use of a water jet loom allowing high-speed weaving relatively easily is desirable for improvement in productivity.

During weaving by the method of producing the airbag fabric according to the present invention, the warp yarn tension is preferably adjusted to 75 to 230 cN/yarn, more preferably 100 to 200 cN/yarn. It may reduce the volume of the voids among the monofilaments in the bundle of the multifilament yarns for the fabric and thus reduce the air permeability of the fabric by controlling the warp yarn tension in the range above. In addition, it may, by making the warp yarns under tension bend the weft yarns after the weft yarn is beaten, increase the structurally restraining force of the fabric in the weft yarn direction, improve the yarn displacement resistance of the fabric and prevent air leakage due to the yarn displacement in the sewing region when the airbag is formed. A warp yarn tension of less than 75 cN/yarn does not lead to increase in contact area between the warp and weft yarns in the fabric, prohibiting improvement in edgecomb resistance. It is also ineffective in reducing the volume of the voids among monofilaments and thus unfavorable for reduction of air permeability. Alternatively, a warp yarn tension of more than 230 cN/yarn leads to fuzzing of the warp yarns and deterioration in weaving efficiency.

Specifically, the warp yarn tension can be controlled in the range above, for example, by adjusting the delivery speed of the warp yarns or the weave-in speed of the weft yarn in the loom. It may determine whether the warp yarn tension is actually in the range above during weaving, for example, by monitoring the tension applied to each warp yarn by using a tensiometer at the center between the warp beam and the back roller during operation of the loom.

A difference of 10 to 90% is preferably made between the tensions of the top and bottom warp yarns in the shed. In this way, the warp yarn-bending structure described above is formed easily and the warp and weft yarns are pressed to each other tightly, leading to increase in frictional resistance between the yarns and improvement in edgecomb resistance.

The difference between the tensions of the top and bottom warp yarns in the shed is formed by differentiating the running length of the top yarns from that of the bottom yarns, for example by means of placing a back roller at a relatively higher position. It may make a difference between the tensions of the top and bottom yarns, for example, by installing a guide roll at a position between the back roller and the heald frame and displacing the shedding fulcrum upward or downward from the warp line by using the guide roll, thus elongating the running length of yarns relative to the other yarns and thus, raising the tension thereof. As for the installation position, the guide roll is preferably installed at the position between the back roller and the heald frame separated by 20 to 50% from the back roller. Alternatively, the position of the shedding fulcrum is preferably separated from the warp line by 5 cm or more.

Alternatively, the difference between the tensions of the top and bottom yarns may be made, for example, by using cam-driven mechanism as the shedding device and making the dwell angle of the top or bottom yarn larger by 100 degrees or more than that of the other. The yarn supplied from the direction of the larger dwell angle has higher tension applied.

A bar temple is preferably used as the temple of the loom. If a bar temple is used, the weft yarn can be beaten while the entire fabric is held, leading to reduction in volume of the voids among synthetic fiber yarns and consequently to improvement in low air permeability and yarn displacement resistance.

After the weaving step, the fabric is processed, for example by scouring and heat setting, as needed. For lower air permeability, the fabric may be coated with a resin or bonded to a film, as needed.

The airbag according to the present invention is a bag prepared by sewing the airbag fabric into a bag shape and connecting it to additional devices such as inflator. The airbag according to the present invention may be used as a airbag for driver's seat, passenger seat or rear seat, or alternatively for side-wall protection. It is suitable for use as an airbag for driver's seat or passenger seat that demands particularly large restrainting force.

EXAMPLES

Hereinafter, the present invention will be described in more detail with reference to Examples, but it should be understood that the scope of the present invention is not restricted by the following Examples.

[Measurement Method]

In the following Examples and Comparative Examples, the fabric thickness, the weaving densities of the warp yarn and weft yarns, the fabric basis weight, the tensile strength, the breaking elongation, the tearing strength, the air permeability, the packability, the edgecomb resistance, the warp yarn tension, the tensions of the top and bottom yarns applied during warp yarn shedding, and the overall rating were determined according to the following methods:

(1) Fabric Thickness

The thickness of fabric was determined according to the method specified in JIS L1096: 1999 8.5 by means of a thickness meter at five different positions of a sample under a pressure of 23.5 kPa and after 10 seconds for stabilization of the thickness, and the average was calculated.

(2) Weaving Density of Warp or Weft Yarns

It was determined by the method specified in JIS L1096: 1999 8.6.1. A sample was placed on a flat table for elimination of unnatural wrinkles and tension, and the numbers of the warp yarns and weft yarns in an interval of 2.54 cm at five different sites were counted, and the averages thereof were calculated.

(3) Fabric Basis Weight

It was determined by the method specified in JIS L1096: 1999 8.4.2 by collecting three test pieces of 20 cm×20 cm in size and measuring the masses (g) thereof, and the average was expressed by mass per 1 m$^2$ (g/m$^2$)

(4) Tensile Strength

It was determined according to the method specified in JIS K6404-3, 6 Test method B (strip method), by preparing five test pieces respectively in the warp and weft directions, adjusting the width of each test piece to 30 mm by removing yarns from both sides, and measuring the maximum load while stretching the fabric at a chuck distance of 150 mm and a stress rate of 200 mm/min until break of the test piece in a constant-rate traverse type test machine, and the averages respectively in the warp and weft directions were calculated.

(5) Breaking Elongation

It was determined according to the method specified in JIS K6404-3, 6 test method B (strip method), by preparing five test pieces respectively in the warp and weft directions, adjusting the width of each test piece to 30 mm by removing yarns from both sides, and drawing mark lines on the center of each test piece at an interval of 100 mm, measuring the distance between the marked lines directly after the fabric was stretched at a chuck distance of 150 mm and a stress rate of 200 mm/min until cleavage of the test piece in a constant-rate traverse type test machine, and calculating the breaking elongation according to the following Formula, and the averages respectively in the machine and in crosswise directions were calculated:

$$E=[(L-100)/100] \times 100$$

wherein, E: breaking elongation (i), and
L: distance between marked lines at breakage (mm).

(6) Tearing Strength

It was determined according to the method specified in JIS K6404-4, 6. Test method B (Single-Tongue Method) by collecting five test pieces of long side 200 mm×short side 76 mm in size respectively in the machine and crosswise directions, forming a cut having a length of 75 mm at the center of the short side of each test piece in the direction perpendicular to the base, stretching the test piece and measuring the tearing load then while the fabric was stretched at a chuck distance of 150 mm and a stress rate of 200 mm/min until cleavage of the test piece in a constant-rate traverse type test machine. Three largest maximum points in the order from the largest, excluding the first peak, on the line in the tearing load chart obtained were selected, and the average thereof was determined. Finally, the averages respectively in the warp and weft directions were calculated.

(7) Air Permeability

The air permeability was determined according to the method specified in JIS L1096: 19998.27., 1 Method A (Frajour-type method), at a test pressure difference of 19.6 kPa. Five test pieces of about 20 cm×20 cm in size were collected from different position of a sample; each test piece was connected to one end of a circular cylinder having a diameter of 100 mm and fixed thereto in such a manner that there is no leakage of air from the connected position; the amount of the air permeation when the test pressure difference was adjusted to 19.6 kPa by using a regulator was determined with a flow-meter; and the average of the results from the five test pieces was calculated.

(8) Packability

It was determined according to the method specified in ASTM D6478-02.

(9) Edgecomb Resistance

It was determined according to the method specified in ASTM D6479-02.

(10) Warp Yarn Tension

The tension applied to a single warp yarn in the region at the center between the warp beam and the back roller was determined during operation of the loom, by using Check Master (registered trade name) (type: CM-200FR) manufactured by Kanai Koki Co., Ltd.

(11) Tensions Applied to the Top and Bottom Yarns in the Warp Yarn Shed

The loom was stopped in the state wherein the warp yarns were shed, and the tension applied to a single top warp yarn was determined as the top yarn tension by using a tension meter used in (10) above at the position between the back roller and the heald frame (between the guide roll and the heald frame in the case of a guide roll being installed between the back roller and the heald frame). Similarly, the tension applied to a bottom-sided warp yarn was also determined as the bottom yarn tension.

(12) Criteria for Overall Rating

When the air permeability and the edgecomb resistance obtained by the measurement methods above, as shown in a Table shown below, satisfy respectively desired values of 1.0 L/cm²·min or less and 400N or more, the case was ranked "○"; the case when these values satisfy one of the requirements was ranked "Δ"; and the case when these values satisfy none of the requirements was ranked "x".

Example 1

Warp and Weft Yarns

An untwisted synthetic fiber multifilament yarn of nylon 66 having a circular monofilament cross-section, a monofilament fineness of 2.6 dtex, a filament number of 136, a total fineness of 350 dtex, a tenacity of 8.5 cN/dtex, and an elongation 23.5% was used as the warp and weft yarns.

(Weaving Step)

A fabric having a warp-yarn weaving density of 56 yarns/2.54 cm and a weft-yarn weaving density of 64 yarns/2.54 cm was woven by using the warp and weft yarns.

The loom used was a water jet loom; a bar temple was installed at a position between the beating point and the friction roller as a holder of the fabric; and a guide roll was installed between the back roller and the heald frame at a position 40 cm from the back roller, for raising the warp line from the warp yarn by 7 cm.

As for the weaving condition, the warp yarn tension during weaving was adjusted to 147 cN/yarn, the top yarn tension not during operation of the weaving machine to 118 cN/yarn, and the bottom yarn tension to 167 cN/yarn, and the rotational frequency of the weaving machine was adjusted to 500 rpm.

(Heat-Setting Step)

The fabric was then heat-set with a pin tenter under dimensional restraint at a width shrinkage rate of 0% and an overfeed rate of 0% at 160° C. for 1 minute.

The airbag fabric obtained was superior in low air permeability and compactness in packing, and the edgecomb resistances in the warp and weft directions were well balanced and satisfied the desired values.

Comparative Example 1

Warp and Weft Yarns

The same yarn as used in Example 1 was used as the warp and weft yarns.

(Weaving Step)

A fabric was woven by using the warp and weft yarns at a warp-yarn weaving density of 64 yarns/2.54 cm and a weft-yarn weaving density of 56 yarns/2.54 cm.

The configuration and the weaving condition of the loom were the same as those in Example 1.

(Heat-Setting Step)

The fabric was then heat-set in the same way as Example 1.

The airbag fabric obtained was satisfactory in air permeability but unfavorable in edgecomb resistance in the weft direction and ill-balanced in the edgecomb resistance between in the warp and weft directions.

Comparative Example 2

Warp and Weft Yarns

The same yarn as used in Example 1 was used as the warp and weft yarns.

(Weaving Step)

A fabric was woven by using the warp and weft yarns at a warp-yarn weaving density of 60 yarns/2.54 cm and a weft-yarn weaving density of 60 yarns/2.54 cm.

The configuration and the weaving condition of the loom were the same as those in Example 1.

(Heat-Setting Step)

The fabric was then heat-set in the same way as Example 1.

The airbag fabric obtained was satisfactory in air permeability but unfavorable in edgecomb resistance in the weft direction and ill-balanced in the edgecomb resistance between in the warp and weft directions.

Example 2

Warp and Weft Yarns

The same yarn as used in Example 1 was used as the warp and weft yarns.

(Weaving Step)

A fabric was woven by using the warp and weft yarns at a warp-yarn weaving density of 58 yarns/2.54 cm and a weft-yarn weaving density of 66 yarns/2.54 cm.

The loom used was a water jet loom, and a bar temple was installed between the beating point and the friction roller for holding the fabric. The guide roll used in Example 1 was not installed.

As for the weaving condition, the warp yarn tension during weaving was adjusted to 157 cN/yarn, the top yarn tension not during operation of the loom to 118 cN/yarn, and the bottom yarn tension to 157 cN/yarn, and the rotational frequency of the loom was adjusted to 500 rpm.

(Heat-Setting Step)

The fabric was then heat-set in the same way as Example 1. The airbag fabric obtained was superior in low air permeability and compactness in packing and the edgecomb resistances are well-balanced in the warp and weft directions and satisfied the desired values.

Comparative Example 3

Warp and Weft Yarns

An untwisted synthetic fiber multifilament yarn of nylon 66 having a circular monofilament cross-section, a monofilament fineness of 4.9 dtex, a filament number of 72, a total fineness of 350 dtex, a tenacity of 8.5 cN/dtex, and an elongation 23.5% was used as the warp and weft yarns.

(Weaving Step)

A fabric having a warp-yarn weaving density of 62 yarns/2.54 cm and a weft-yarn weaving density of 62 yarns/2.54 cm was woven by using the warp and weft yarns.

The loom used was a water jet loom, and a bar temple was installed at a position between the beating point and the friction roller as a holder of the fabric. The guide roll used in Example 1 was not installed.

As for the weaving condition, the warp yarn tension during weaving was adjusted to 69 cN/yarn, the top yarn tension not during operation of the loom to 69 cN/yarn, and the bottom yarn tension to 69 cN/yarn, and the rotational frequency of the loom was adjusted to 500 rpm.

(Heat-Setting Step)

The fabric was then heat-set in the same way as Example 1. The airbag fabric obtained was higher in air permeability and the edgecomb resistance thereof was lower in the weft direction, and thus, the edgecomb resistance was ill-balanced in the warp and weft directions.

Example 3

Warp and Weft Yarns

The same yarn as used in Example 1 was used as the warp and weft yarns.

(Weaving Step)

A fabric was woven by using the warp and weft yarns at a warp-yarn weaving density of 54 yarns/2.54 cm and a weft-yarn weaving density of 61 yarns/2.54 cm.

The loom used was a water jet loom; a bar temple was installed at a position between the beating point and the friction roller as a holder of the fabric; and a guide roll was installed between the back roller and the heald frame at a position 30 cm from the back roller, for raising the warp line from the warp yarn by 8 cm.

As for the weaving condition, the warp yarn tension during weaving was adjusted to 176 cN/yarn, the top yarn tension not during operation of the loom to 157 cN/yarn, and the bottom yarn tension to 196 cN/yarn, and the rotational frequency of the loom was adjusted to 500 rpm.

(Heat-Setting Step)

The fabric was then heat-set in the same way as Example 1. The airbag fabric obtained was superior in low air permeability and compactness in packing, and the edgecomb resistances are well-balanced in the warp and weft directions and satisfied the desired values.

Comparative Example 4

Warp and Weft Yarns

An untwisted synthetic fiber multifilament yarn of nylon 66 having a circular monofilament cross-section, a monofilament fineness of 4.9 dtex, a filament number of 72, a total fineness of 350 dtex, a tenacity of 8.5 cN/dtex, and an elongation 23.5% was used as the warp and weft yarns.

(Weaving Step)

A fabric having a warp-yarn weaving density of 54 yarns/2.54 cm and a weft-yarn weaving density of 61 yarns/2.54 cm was woven by using the warp and weft yarns.

The loom used was a water jet loom, and a bar temple was installed at a position between the beating point and the friction roller as a holder of the fabric. The guide roll used in Example 1 was not installed.

As for the weaving condition, the warp yarn tension during weaving was adjusted to 69 cN/yarn, the top yarn tension not during operation of the loom to 69 cN/yarn, and the bottom yarn tension to 69 cN/yarn, and the rotational frequency of the loom was adjusted to 500 rpm.

(Heat-Setting Step)

The fabric was then heat-set in the same way as Example 1. The airbag fabric obtained was higher in air permeability and the edgecomb resistances were lower both in the warp and weft directions.

Example 4

Warp and Weft Yarns

An untwisted synthetic fiber multifilament yarn of nylon 66 having a circular monofilament cross-section, a monofilament fineness of 3.5 dtex, a filament number of 136, a total fineness of 470 dtex, a tenacity of 8.6 cN/dtex, and an elongation 23.0% was used as the warp and weft yarns.
(Weaving Step)

A fabric having a warp-yarn weaving density of 47 yarns/2.54 cm and a weft-yarn weaving density of 53 yarns/2.54 cm was woven by using the warp and weft yarns.

The loom used was a water jet loom, and a bar temple was installed at a position between the beating point and the friction roller as a holder of the fabric. The guide roll used in Example 1 was not installed.

As for the weaving condition, the warp yarn tension during weaving was adjusted to 196 cN/yarn, the top yarn tension not during operation of the loom to 196 cN/yarn, and the bottom yarn tension to 196 cN/yarn, and the rotational frequency of the loom was adjusted to 500 rpm.
(Scouring and Heat-Setting Step)

The fabric was then passed through a hot water shrinkage tank at 60° C. for 20 seconds, dried in a non-touch dryer at 160° C. for 10 seconds, and then heat-set with a pin tenter under dimensional restraint at a width shrinkage rate of 1.0% and an overfeed rate of 0.5% at 180° C. for 1 minute.

The airbag fabric obtained was superior in low air permeability and compactness in packing, and the edgecomb resistances are well-balanced in the warp and weft directions and satisfied the desired values.

Comparative Example 5

Warp and Weft Yarns

The same yarn as used in Example 4 was used as the warp and weft yarns.
(Weaving Step)

A fabric having a warp-yarn weaving density of 49 yarns/2.54 cm and a weft-yarn weaving density of 51 yarns/2.54 cm was woven by using the warp and weft yarns.

The loom used was a water jet loom, and a bar temple was installed at a position between the beating point and the friction roller as a holder of the fabric. The guide roll used in Example 1 was not installed.

As for the weaving condition, the warp yarn tension during weaving was adjusted to 196 cN/yarn, the top yarn tension not during operation of the loom to 196 cN/yarn, and the bottom yarn tension to 196 cN/yarn, and the rotational frequency of the loom was adjusted to 500 rpm.

The configuration and the weaving condition of the loom were the same as those in Example 4.
(Scouring and Heat-Setting Step)

The fabric was then passed through a hot water shrinkage tank at 60° C. for 20 seconds, dried in a non-touch dryer at 160° C. for 10 seconds, and then heat-set with a pin tenter under dimensional restraint at a width shrinkage rate of 1.0 and an overfeed rate of 0.5% at 180° C. for 1 minute.

The scouring and heat-setting step was carried out in the same way as Example 4.

The airbag fabric obtained was favorable in air permeability, but the edgecomb resistances were lower both in the warp and weft directions.

Example 5

Warp and Weft Yarns

An untwisted synthetic fiber multifilament yarn of nylon 66 having a circular monofilament cross-section, a monofilament fineness of 3.3 dtex, a filament number of 72, a total fineness of 235 dtex, a tenacity of 8.4 cN/dtex, and an elongation 23.5% was used as the warp and weft yarns.
(Weaving Step)

A fabric having a warp-yarn weaving density of 68 yarns/2.54 cm and a weft-yarn weaving density of 75 yarns/2.54 cm was woven by using the warp and weft yarns.

The loom used was a water jet loom; a bar temple was installed at a position between the beating point and the friction roller as a holder of the fabric; and a guide roll was installed between the back roller and the heald frame at a position 40 cm from the back roller for raising the warp line from the warp yarn by 8 cm.

As for the weaving condition, the warp yarn tension during weaving was adjusted to 127 cN/yarn, the top yarn tension not during operation of the loom to 108 cN/yarn, and the bottom yarn tension to 147 cN/yarn, and the rotational frequency of the loom was adjusted to 500 rpm.
(Scouring and Heat-Setting Step)

The fabric was then passed through a hot water shrinkage tank at 60° C. for 20 seconds, dried in a non-touch dryer at 160° C. for 10 seconds, and then heat-set with a pin tenter under dimensional restraint at a width shrinkage rate of 1.0% and an overfeed rate of 0.5% at 180° C. for 1 minute.

The airbag fabric obtained was superior in low air permeability and compactness in packing, and the edgecomb resistances are well-balanced in the warp and weft directions and satisfied the desired values.

Example 6

Warp and Weft Yarns

An untwisted synthetic fiber multifilament yarn of nylon 66 having a circular monofilament cross-section, a monofilament fineness of 6.5 dtex, a filament number of 108, a total fineness of 700 dtex, a tenacity of 8.4 cN/dtex, and an elongation 23.5% was used as the warp and weft yarns.
(Weaving Step)

A fabric having a warp-yarn weaving density of 40 yarns/2.54 cm and a weft-yarn weaving density of 44 yarns/2.54 cm was woven by using the warp and weft yarns.

The loom used was a water jet loom; a bar temple was installed at a position between the beating point and the friction roller as a holder of the fabric; and a guide roll was installed between the back roller and the heald frame at a position 40 cm from the back roller, for raising the warp line from the warp yarn by 8 cm.

As for the weaving condition, the warp yarn tension during weaving was adjusted to 196 cN/yarn, the top yarn tension not during operation of the loom to 176 cN/yarn, and the bottom yarn tension to 216 cN/yarn, and the rotational frequency of the loom was adjusted to 500 rpm.
(Scouring and Heat-Setting Step)

The fabric was then passed through a hot water shrinkage tank at 60° C. for 20 seconds, dried in a non-touch dryer at 160° C. for 10 seconds, and then heat-set with a pin tenter under dimensional restraint at a width shrinkage rate of 1.0% and an overfeed rate of 0.5% at 180° C. for 1 minute.

The airbag fabric obtained was superior in low air permeability and compactness in packing, and the edgecomb resistances are well-balanced in the warp and weft directions and satisfied the desired values.

Comparative Example 6

Warp and Weft Yarns

An untwisted synthetic fiber multifilament yarn of nylon 66 having a circular monofilament cross-section, a monofilament fineness of 3.3 dtex, a filament number of 24, a total fineness of 78 dtex, a tenacity of 7.7 cN/dtex, and an elongation 23.0% was used as the warp and weft yarns.
(Weaving Step)
A fabric having a warp-yarn weaving density of 118 yarns/2.54 cm and a weft-yarn weaving density of 130 yarns/2.54 cm was woven by using the warp and weft yarns.
(Weaving Step)
A fabric having a warp-yarn weaving density of 120 yarns/2.54 cm and a weft-yarn weaving density of 132 yarns/2.54 cm was woven by using the warp and weft yarns.
The loom used was a water jet loom, and a bar temple was installed at a position between the beating point and the friction roller as a holder of the fabric. The guide roll used in Example 1 was not installed.
As for the weaving condition, the warp yarn tension during weaving was adjusted to 69 cN/yarn, the top yarn tension not during operation of the loom to 69 cN/yarn, and the bottom yarn tension to 69 cN/yarn, and the rotational frequency of the loom was adjusted to 500 rpm.

(Scouring and Heat-Setting Step)
The fabric was then passed through a hot water shrinkage tank at 60° C. for 20 seconds, dried in a non-touch dryer at 160° C. for 10 seconds, and then heat-set with a pin tenter under dimensional restraint at a width shrinkage rate of 0% and an overfeed rate of 0.5% at 180° C. for 1 minute.
The airbag fabric obtained was higher in air permeability, while the edgecomb resistances were lower both in the warp and weft directions.
The measurement results obtained in Examples and Comparative Examples are summarized in the following Tables 2 and 3. In Examples to 6, all data on air permeability and edgecomb resistance satisfied the desired values. In contrast in Comparative Examples 1 to 6, there was no data on air permeability and edgecomb resistance satisfying both of the desired values. The fact indicates that the airbag fabric according to the present invention has functions favorable as airbag.

TABLE 2

|  | Unit | Example 1 | Comparative Example 1 | Comparative Example 2 | Example 2 | Comparative Example 3 | Example 3 |
| --- | --- | --- | --- | --- | --- | --- | --- |
| Warp yarn total fineness | dtex | 350 | 350 | 350 | 350 | 350 | 350 |
| Warp yarn monofilament fineness | dtex | 2.6 | 2.6 | 2.6 | 2.6 | 4.9 | 2.6 |
| Weft yarn total fineness | dtex | 350 | 350 | 350 | 350 | 350 | 350 |
| Weft yarn monofilament fineness | dtex | 2.6 | 2.6 | 2.6 | 2.6 | 4.9 | 2.6 |
| Warp yarn weaving density (Nw) | Yarns/2.54 cm | 56 | 64 | 60 | 58 | 62 | 54 |
| Weft-yarn weaving density (Nf) | Yarns/2.54 cm | 64 | 56 | 60 | 66 | 62 | 61 |
| Warp yarn cover factor (CF1) |  | 994 | 1136 | 1065 | 1029 | 1100 | 958 |
| Weft yarn cover factor (CF2) |  | 1136 | 994 | 1065 | 1171 | 1100 | 1083 |
| CF2/CF1 |  | 1.14 | 0.88 | 1.00 | 1.14 | 1.00 | 1.13 |
| CF2 + CF1 |  | 2130 | 2130 | 2130 | 2200 | 2200 | 2041 |
| Warp yarn tension during weaving | cN/yarn | 147 | 147 | 147 | 157 | 69 | 176 |
| Top yarn tension not during weaving | cN/yarn | 118 | 147 | 147 | 157 | 69 | 157 |
| Bottom yarn tension not during weaving | cN/yarn | 167 | 147 | 147 | 157 | 69 | 196 |
| Temple used |  | Bar temple | Bar temple | Bar temple | Bar temple | Ring temple | Bar temple |
| Fabric thickness | mm | 0.24 | 0.25 | 0.24 | 0.25 | 0.26 | 0.24 |
| Fabric basis weight | g/m2 | 171 | 172 | 171 | 177 | 178 | 165 |
| Tensile strength (machine/crosswise) | N/cm | 591/678 | 664/598 | 630/695 | 621/695 | 645/650 | 574/627 |
| Breaking elongation (machine/crosswise) | % | 30/24 | 32/25 | 33/24 | 32/23 | 33/25 | 28/25 |
| Tear strength (machine/crosswise) | N | 158/155 | 165/149 | 160/163 | 151/145 | 153/155 | 167/164 |
| Fabric air permeation | L/cm2 · min | 0.55 | 0.57 | 0.48 | 0.48 | 1.10 | 0.63 |
| Packability | cm3 | 1470 | 1550 | 1590 | 1900 | 2005 | 1240 |
| Edgecomb resistance in machine direction (EC1) | N | 570 | 478 | 440 | 565 | 500 | 526 |
| Edgecomb resistance in traverse direction (EC2) | N | 604 | 303 | 330 | 645 | 380 | 507 |
| EC2/EC1 |  | 1.06 | 0.63 | 0.75 | 1.14 | 0.76 | 0.96 |
| Overall rating |  | ◯ | Δ | Δ | ◯ | X | ◯ |

TABLE 3

|  | Unit | Comparative Example 4 | Example 4 | Comparative Example 5 | Example 5 | Example 6 | Comparative Example 6 |
| --- | --- | --- | --- | --- | --- | --- | --- |
| Warp yarn total fineness | dtex | 350 | 470 | 470 | 235 | 700 | 78 |
| Warp yarn monofilament fineness | dtex | 4.9 | 3.5 | 3.5 | 3.3 | 6.5 | 3.3 |
| Weft yarn total fineness | dtex | 350 | 470 | 470 | 235 | 700 | 78 |
| Weft yarn monofilament fineness | dtex | 4.9 | 3.5 | 3.5 | 3.3 | 6.5 | 3.3 |
| Warp yarn weaving density (Nw) | Yarns/2.54 cm | 54 | 47 | 49 | 68 | 40 | 120 |
| Weft-yarn weaving density (Nf) | Yarns/2.54 cm | 61 | 53 | 51 | 75 | 44 | 132 |
| Warp yarn cover factor (CF1) |  | 958 | 967 | 1008 | 989 | 1004 | 1005 |
| Weft yarn cover factor (CF2) |  | 1083 | 1090 | 1049 | 1091 | 1104 | 1106 |
| CF2/CF1 |  | 1.13 | 1.13 | 1.04 | 1.10 | 1.10 | 1.10 |
| CF2 + CF1 |  | 2041 | 2057 | 2057 | 2080 | 2108 | 2111 |
| Warp yarn tension during weaving | cN/yarn | 69 | 196 | 196 | 127 | 196 | 69 |
| Top yarn tension not during weaving | cN/yarn | 69 | 196 | 196 | 108 | 176 | 69 |
| Bottom yarn tension not during weaving | cN/yarn | 69 | 196 | 196 | 147 | 216 | 69 |
| Temple used |  | Ring temple | Bar temple | Bar temple | Bar temple | Bar temple | Ring temple |

TABLE 3-continued

| | Unit | Comparative Example 4 | Example 4 | Comparative Example 5 | Example 5 | Example 6 | Comparative Example 6 |
|---|---|---|---|---|---|---|---|
| Fabric thickness | mm | 0.25 | 0.30 | 0.31 | 0.23 | 0.36 | 0.15 |
| Fabric basis weight | g/m2 | 166 | 191 | 192 | 135 | 242 | 85 |
| Tensile strength (machine/crosswise) | N/cm | 569/633 | 652/719 | 675/694 | 509/589 | 780/855 | 241/281 |
| Breaking elongation (machine/crosswise) | % | 29/26 | 31/27 | 30/27 | 30/29 | 32/27 | 28/24 |
| Tear strength (machine/crosswise) | N | 170/174 | 185/183 | 189/185 | 108/110 | 246/251 | 38/40 |
| Fabric air permeation | L/cm2 · min | 1.61 | 0.81 | 0.77 | 0.98 | 0.95 | 2.23 |
| Packability | cm3 | 1860 | 1780 | 1810 | 1350 | 1970 | 1130 |
| Edgecomb resistance in machine direction (EC1) | N | 356 | 405 | 365 | 635 | 451 | 252 |
| Edgecomb resistance in traverse direction (EC2) | N | 393 | 437 | 394 | 693 | 403 | 278 |
| EC2/EC1 | | 1.10 | 1.08 | 1.08 | 1.09 | 0.89 | 1.10 |
| Overall rating | | X | ○ | Δ | ○ | ○ | X |

INDUSTRIAL APPLICABILITY

The airbag fabric according to the present invention is superior both in low air permeability and compactness in packing that are needed for airbag fabric and also in edgecomb resistance. For that reason, the airbag fabric according to the present invention can be used favorably, in particular, as an airbag for driver's seat or passenger seat and also as a side airbag for protection from side wall collision, but the application thereof is not limited thereto.

What is claimed is:

1. An airbag fabric consisting of warp and weft yarns of synthetic fiber yarn, the strain of the weft yarns being greater than that of the warp yarns and the bending of the warp yarns being greater than that of the weft yarns, and said airbag fabric being characterized by satisfying the following requirements:
   (1) the total fineness of the synthetic fiber yarn is 100 to 700 dtex;
   (2) CF2/CF1≥1.10
wherein,
CF1 represents the cover factor of the warp yarns:

$$CF1 = (Dw \times 0.9)^{1/2} \times Nw,$$

CF2 represents the cover factor of the weft yarns:

$$CF2 = (Df \times 0.9)^{1/2} \times Nf,$$

Dw represents the total fineness of the warp yarn (dtex),
Df represents the total fineness of the weft yarn (dtex),
Nw represents the weaving density of warp yarns (yarns/2.54 cm), and
Nf represents the weaving density of weft yarns (yarns/2.54 cm);
   (3) EC1≥400N, and EC2≥400N
wherein,
EC1 represents the edgecomb resistance (N) in the warp direction, as determined according to ASTM D6479-02, and EC2 represents the edgecomb resistance (N) in the weft direction, as determined according to ASTM D6479-02;
   (4) 0.85≤EC2/EC1≤1.15; and
   (5) air permeability, as determined according to the Frajour type method specified in JIS L1096 at a test pressure difference of 19.6 kPa, is 1.0 L/cm²·min or less.

2. The airbag fabric according to claim 1, wherein the warp and weft yarns are made of the same synthetic fiber yarn.

3. The airbag fabric according to claim 1, wherein the fineness of the monofilament fibers for the warp and weft yarns is 1 to 7 dtex.

4. The airbag fabric according to claim 1, wherein the cover factor of the warp yarns CF1 and the cover factor of the weft yarns CF2 are both 950 to 1250.

5. The airbag fabric according to claim 1, wherein the sum of the cover factor of the warp yarns CF1 and the cover factor of the weft yarns CF2 is 2000 or more and less than 2300.

6. An airbag, characterized by being prepared by sewing the airbag fabric according to claim 1.

7. A method of producing an airbag fabric consisting of warp and weft yarns of synthetic fiber yarn, the strain of the weft yarns being greater than that of the warp yarns and the bending of the warp yarns being greater than that of the weft yarns, the airbag fabric characterized by satisfying the following requirements:
   (1) the total fineness of the synthetic fiber yarn is 100 to 700 dtex;
   (2) CF2/CF1≥1.10
wherein,
CF1 represents the cover factor of the warp yarns:

$$CF1 = (Dw \times 0.9)^{1/2} \times Nw,$$

CF2 represents the cover factor of the weft yarns:

$$CF2 = (Df \times 0.9)^{1/2} \times Nf,$$

Dw represents the total fineness of the warp yarn (dtex),
Df represents the total fineness of the weft yarn (dtex),
Nw represents the weaving density of warp yarns (yarns/2.54 cm), and
Nf represents the weaving density of weft yarns (yarns/2.54 cm);
   (3) EC1≥400N, and EC2≥400N
wherein,
EC1 represents the edgecomb resistance (N) in the warp direction, as determined according to ASTM D6479-02, and EC2 represents the edgecomb resistance (N) in the weft direction, as determined according to ASTM D6479-02;
   (4) 0.85≤EC2/EC1≤1.15; and
   (5) air permeability, as determined according to the Frajour type method specified in JIS L1096 at a test pressure difference of 19.6 kPa, is 1.0 L/cm²·min or less, characterized by weaving the fabric at a warp yarn tension adjusted to 75 to 230 cN/yarn.

8. A method of producing an airbag fabric consisting of warp and weft yarns of the synthetic fiber yarn, the strain of the weft yarns being greater than that of the warp yarns and the bending of the warp yarns being greater than that of the weft yarns, the airbag fabric characterized by satisfying the following requirements:
   (1) the total fineness of the synthetic fiber yarn is 100 to 700 dtex;
   (2) CF2/CF1≥1.10
wherein,
CF1 represents the cover factor of the warp yarns:

$$CF1 = (Dw \times 0.9)^{1/2} \times Nw,$$

CF2 represents the cover factor of the weft yarns:

$$CF2=(Df\times 0.9)^{1/2}\times Nf,$$

Dw represents the total fineness of the warp yarn (dtex),
Df represents the total fineness of the weft yarn (dtex),
Nw represents the weaving density of warp yarns (yarns/2.54 cm), and
Nf represents the weaving density of weft yarns (yarns/2.54 cm);

(3) EC1≥400N, and EC2≥400N
wherein,
EC1 represents the edgecomb resistance (N) in the warp direction, as determined according to ASTM D6479-02, and EC2 represents the edgecomb resistance (N) in the weft direction, as determined according to ASTM D6479-02;

(4) 0.85≤EC2/EC1≤1.15; and (5) air permeability, as determined according to the Frajour type method specified in JIS L1096 at a test pressure difference of 19.6 kPa, is 1.0 L/cm·min or leis, characterized by weaving the fabric while making a difference of 10 to 90% between the tensions of the top and bottom yarns applied during warp yarn shedding.

9. The method of producing an airbag fabric according to claim 7, wherein a bar temple is used as the temple during weaving.

10. The method of producing an airbag fabric according to claim 8, wherein a bar temple is used as the temple during weaving.

11. An airbag fabric consisting of warp and weft yarns of synthetic fiber yarn, the strain of the weft yarns being greater than that of the warp yarns and the bending of the warp yarns being greater than that of the weft yarns, and said airbag fabric being characterized by satisfying the following requirements:

(1) the total fineness of the synthetic fiber yarn is 100 to 700 dtex;

(2) CF2/CF1≥1.10
wherein,
CF1 represents the cover factor of the warp yarns:

$$CF1=(Dw\times 0.9)^{1/2}\times Nw,$$

CF2 represents the cover factor of the weft yarns:

$$CF2=(Df\times 0.9)^{1/2}\times Nf,$$

Dw represents the total fineness of the warp yarn (dtex),
Df represents the total fineness of the weft yarn (dtex),
Nw represents the weaving density of warp yarns (yarns/2.54 cm), and
Nf represents the weaving density of weft yarns (yarns/2.54 cm);

(3) EC1≥400N, EC2≥400N
wherein,
EC1 represents the edgecomb resistance (N) in the warp direction, as determined according to ASTM D6479-02,
EC2 represents the edgecomb resistance (N) in the weft direction, as determined according to ASTM D6479-02;

(4) 0.85≤EC2/EC1≤1.15

(5) air permeability, as determined according to the Frajour type method specified in JIS L1096 at a test pressure difference of 19.6 kPa, is 1.0 L/cm²·min or less; and (6) packability according to the method specified in ASTM D6478-02 is 1240 to 1970.

12. The airbag fabric according to claim 1, wherein the total fineness of the synthetic fiber yarn is 300 to 400 dtex.

13. The airbag fabric according to claim 3, wherein the fineness of the monofilament fibers for the warp and weft yarns is 2.0 to 3.0 dtex.

\* \* \* \* \*